April 28, 1953     J. COVITT ET AL     2,636,647
DISPENSER FOR CATSUP AND THE LIKE HAVING
A VALVE-CONTROLLED OUTLET IN
CONJUNCTION WITH A PLUNGER
Filed Nov. 30, 1949
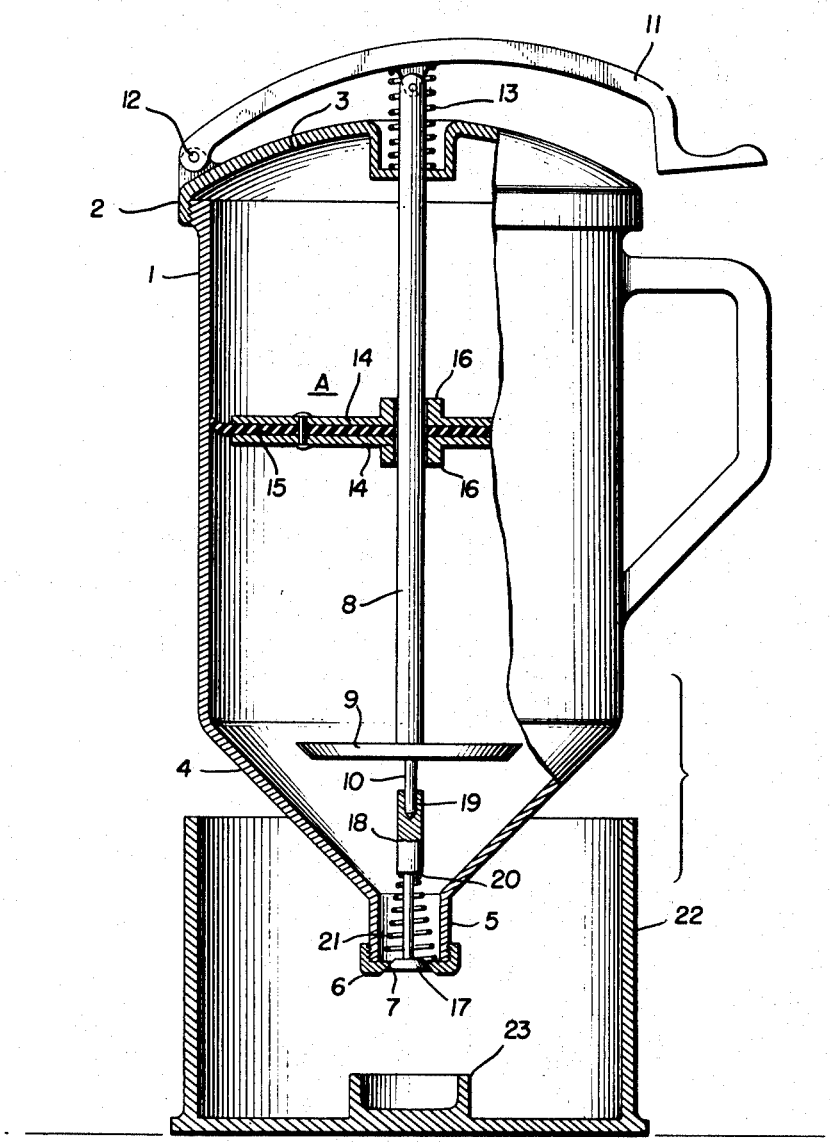
INVENTORS
JACK COVITT
BY VIRGIL L. STAFFORD
ATTORNEY Patented Apr. 28, 1953

2,636,647

UNITED STATES PATENT OFFICE 2,636,647

DISPENSER FOR CATSUP AND THE LIKE HAVING A VALVE-CONTROLLED OUTLET IN CONJUNCTION WITH A PLUNGER

Jack Covitt and Virgil L. Stafford, Fort Wayne, Ind.

Application November 30, 1949, Serial No. 130,194

3 Claims. (Cl. 222—260)

This invention relates to improvements in dispensers for catsup, mustard, syrup and the like, and has for a purpose an appliance by which material of that character is readily dispensed where desired without dripping or waste.

Another object of the invention is to afford a means conveniently manipulated for urging from the container the material contained therein through a valve-controlled outlet.

A further object of the invention is the provision of a floating partition in a container for the material to be dispensed by which the material is urged toward the outlet.

And a still further object of the invention is to afford a valve-controlled outlet for a container in conjunction with a plunger for forcefully urging material in the container to be dispensed when the valve is opened and the plunger is activated concurrently.

Other objects and advantages of the invention appear in the following description.

An illustrative embodiment of the invention is shown in the accompanying drawing which is a side elevational view of a structure in which the invention is incorporated, the view being partially cut away and other parts in section.

The illustrative embodiment of the invention consists of a cylindrical container 1 having on its top a removable lid 2 provided with a vent opening 3, the lower end of the container having a tapered extension 4 terminating with a neck 5 that has secured thereon a removable cap 6 having a concentric valve seat 7 therein.

Within the container 1 there is disposed a vertically movable shaft 8 that extends upward loosely through the lid, the lower end of the shaft having secured thereon a plunger 9 and a guide-pin 10 extending downwardly beyond the plunger. The top of the shaft 8 bears against an operating lever 11 which is pivoted at one end as indicated by 12 to the top of the lid, and there is interposed between the lever and the lid a compression spring 13 that tends to sustain the lever in its uppermost position.

Concentric with the shaft and the inner wall of the container 1 there is disposed a float indicated generally by A, preferably consisting of opposing disks 14 between which is clamped another disk constituting a squeegee 15 the outer perimeter of which extends beyond the clamped flanges and slidingly contacts the inner wall of the container 1. The bore of the hub 16 and the squeegee is such as to permit free movement of the float axially on the shaft 8 so as to permit the float A to follow freely the underlying material in the lower part of the container as the material is discharged through the valve-seat 7.

There is provided an outflow check valve 17 having a stem 18 that extends upwardly into the container and has a concentric cavity 19 into which the guide-pin 10 loosely projects. Between the cap 6 and a shoulder 20 on the stem 18 is disposed an expansion spring 21 which tends to hold the valve 17 normally in closed position.

There is provided a holder for the container consisting of a cup 22 in the bottom of which is a socket 23 into which is received the capped end of the receptacle when the container is placed into the cup, thus to sustain the container centralized with respect to the cup.

In use, the lid together with the operating lever, shaft 8, float A and plunger 9 are removed from the container, after which the material to be dispensed is introduced into the container. The parts previously removed are then replaced, whereupon, the plunger is submerged and the float rests upon the material previously introduced. These operations conveniently are performed while the container is positioned in the cup.

In dispensing material from the device, the container is lifted from the cup and held suitably over the place where required, and then by manipulating the lever 11 downward, pressure is exerted on the shaft causing corresponding movement of the plunger 9 and opening of the valve 17, thus causing forced expulsion of the material from the container and incidentally the float A descends as the level of fluid remaining in the container recedes.

Variations from the particular construction above disclosed may be resorted to by the exercise of skill in the art, without departure from the spirit or scope of the invention.

What we claim is:

1. A dispenser for catsup, mustard and the like, said dispenser consisting of a cylindrical container having a removable lid on its top provided with a vent opening, the lower end of the container being tapered inwardly and terminating with a neck provided with a removable cap, the cap having at its lower end a concentric valve seat, a movable shaft in the container extending loosely through the lid, a plunger secured on the lower end of the shaft provided with a guide pin, an outflow check-valve normally closed against said valve seat provided with a stem extending into the container and having an axial cavity into which said guide pin loosely projects, a spring for holding the valve in closed position, a float through which said shaft loosely extends provided with a squeegee the periphery of which bears against the inner wall of the container, an operating lever pivotally supported on said lid, and another spring concentric with said shaft disposed between the operating lever and the lid.

2. A dispenser for serving catsup, mustard and the like, said dispenser comprising a container having a vented removable lid on its top, the lower end of the container being tapered inwardly and provided with an outflow check-valve in its lowest portion, said check-valve being provided with a spring-restrained stem that extends into the container, an axially movable shaft disposed in the container the upper end of which extends loosely through said lid and the lower end of which has guided relation with said valve stem, a plunger secured on the shaft disposed in the tapered lower part of the container, a float through which said shaft loosely extends having peripheral contact with the inner wall of the container, and a spring-restrained operating lever pivotally supported on said lid for activating the shaft whereby to simultaneously open the valve and activate the plunger.

3. A dispenser for serving catsup, mustard and the like, said dispenser comprising a container having a removable top and an inwardly tapered lower end closed by a removable cap having a valve seat, an outflow check-valve engaging said seat provided with a spring-restrained stem projecting into the container, a shaft extending loosely through the top of the container and having engagement at its lower end with said stem and provided with a plunger secured thereon disposed in the lower part of the container above said check-valve, a float through which the shaft loosely extends and having peripheral contact with the inner wall of the container, and a spring-restrained operating lever atop the container engaging the shaft whereby said valve is opened and the plunger activated simultaneously upon manipulation of said lever.

JACK COVITT.
VIRGIL L. STAFFORD.

References Cited in the file of this patent

UNITED STATES PATENTS

| Number | Name | Date |
|---|---|---|
| 853,769 | Caviglia | May 14, 1907 |
| 901,714 | Langstaff | Oct. 20, 1908 |
| 933,699 | De Laurence | Sept. 7, 1909 |
| 1,024,988 | Greaves | Apr. 30, 1912 |
| 1,071,063 | Lee | Aug. 26, 1913 |
| 1,306,607 | Montgomery | June 10, 1919 |
| 1,313,174 | Eisenhardt | Aug. 12, 1919 |
| 1,638,456 | Pike | Aug. 9, 1927 |
| 1,699,347 | Coffin et al. | Jan. 15, 1929 |
| 1,862,883 | Cheney | June 14, 1932 |
| 2,084,568 | White | June 12, 1937 |
| 2,363,474 | Schlesinger | Nov. 21, 1944 |
| 2,443,022 | Berg | June 8, 1948 |